June 25, 1929.          R. H. UHLINGER          1,718,720
              APPARATUS FOR THE PRODUCTION OF CARBON BLACK
                     Filed Nov. 22, 1924        3 Sheets-Sheet 3
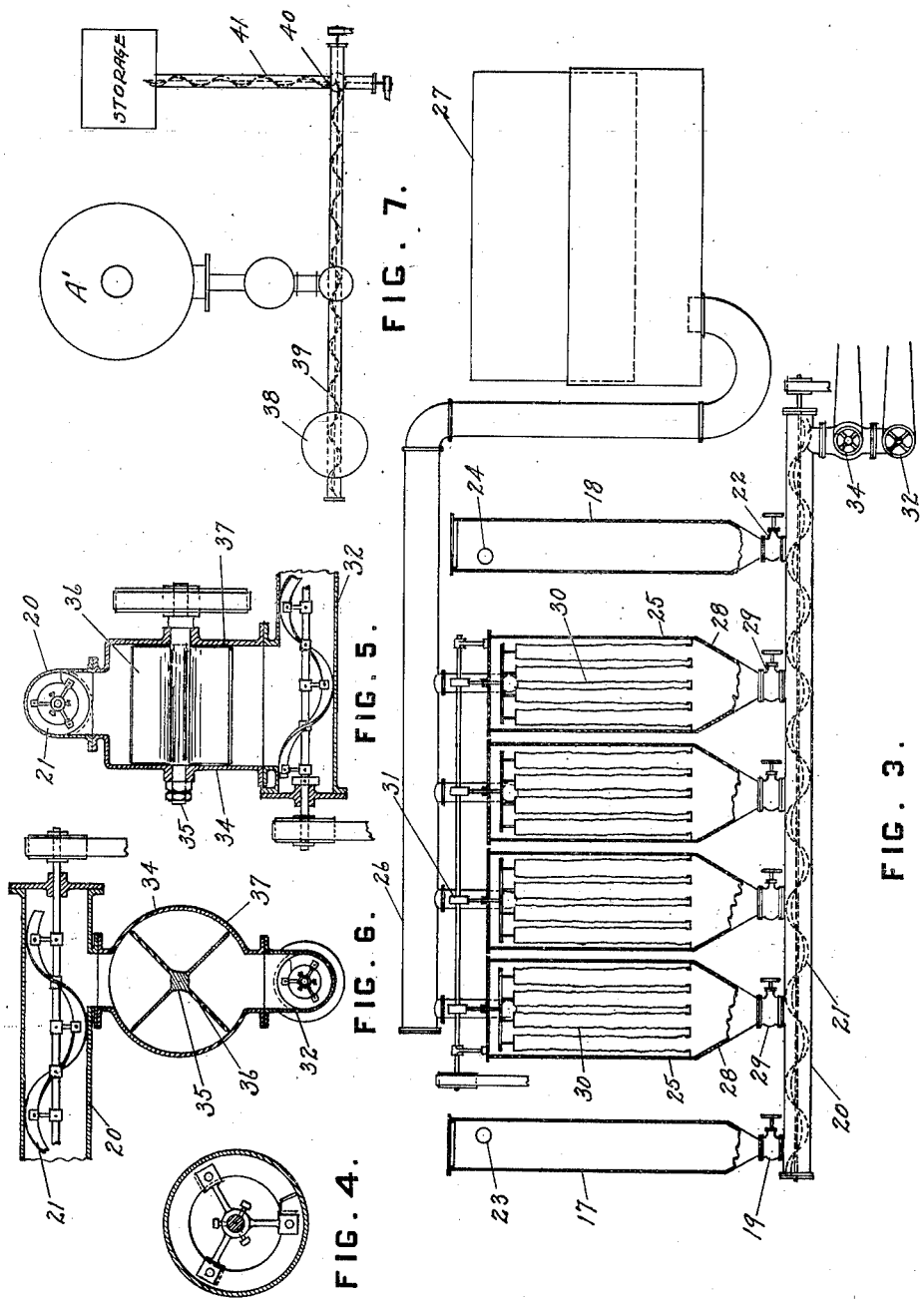
INVENTOR
Roy H. Uhlinger
by William B. Wharton
his attorney Patented June 25, 1929.

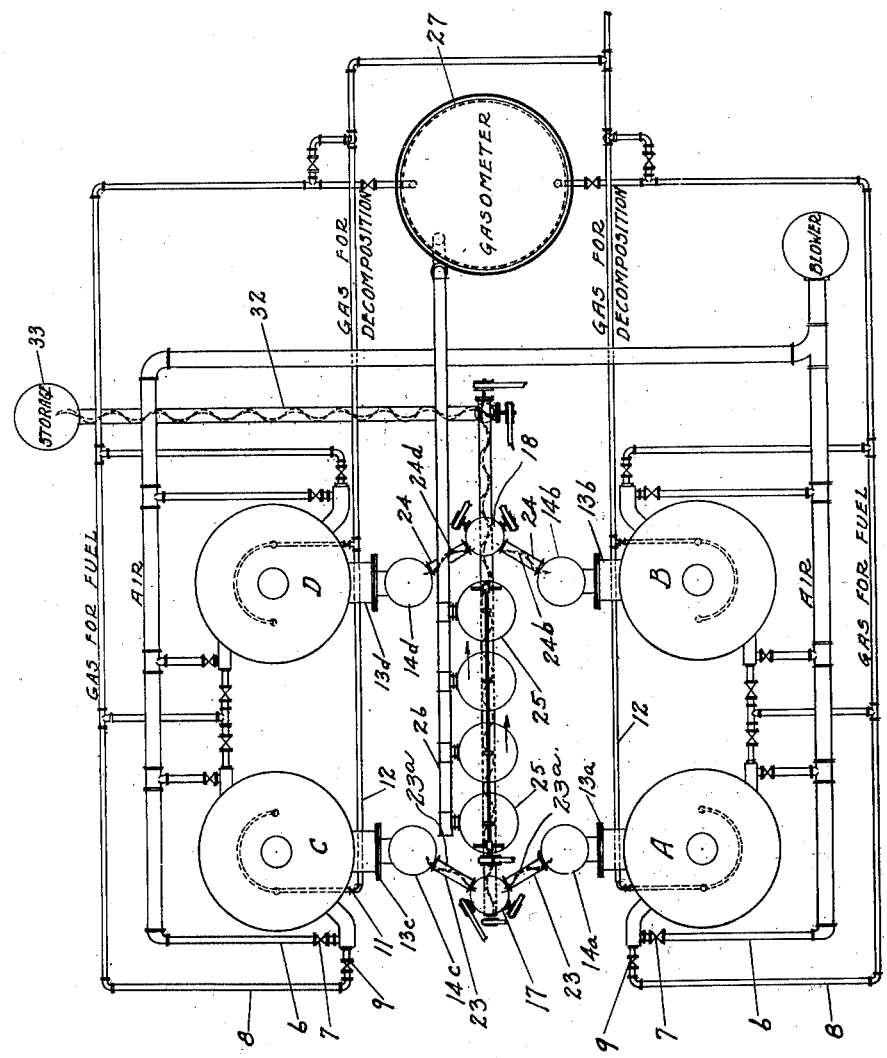

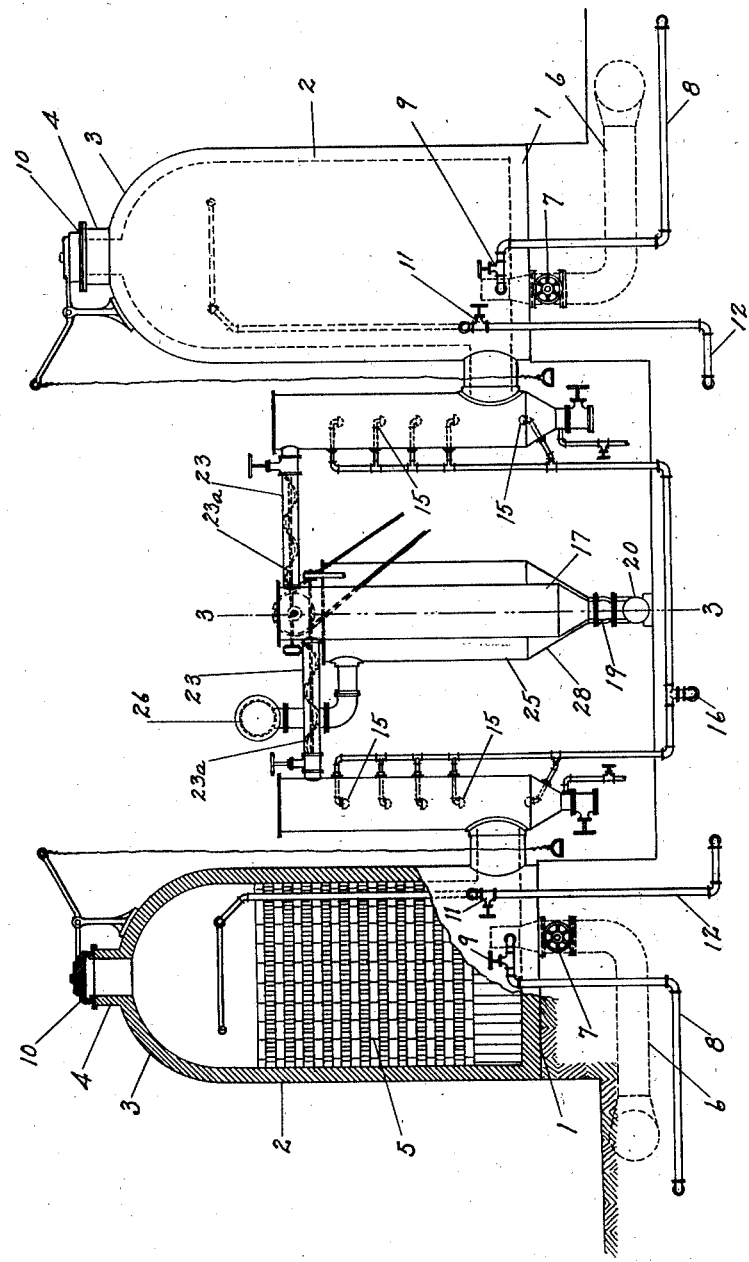

1,718,720

UNITED STATES PATENT OFFICE.

ROY H. UHLINGER, OF PITTSBURGH, PENNSYLVANIA, ASSIGNOR TO THERMATOMIC CARBON COMPANY, OF PITTSBURGH, PENNSYLVANIA, A CORPORATION OF DELAWARE.

APPARATUS FOR THE PRODUCTION OF CARBON BLACK

Application filed November 22, 1924. Serial No. 751,484.

This invention relates to apparatus for the production and collection of carbon black obtained by the decomposition of suitable hydrocarbons; and relates particularly to apparatus for carrying out the general method for the production and collection of carbon black described and claimed in the application of Roy H. Brownlee and Roy H. Uhlinger Serial No. 542,303, Filed March 9, 1922.

One object of the invention is to provide apparatus for use in conducting such decomposing method, which is particularly arranged for economical operation.

Another object of the invention is to provide an operating unit for producing and delivering carbon black, in which the elements and connections are so arranged as to avoid clogging of the same by deposition of the carbon black from the gases with which it is mixed when passed from the furnace, or by massing and packing of the carbon black after its separation from such gases.

Another object of the invention is to provide apparatus which insures that the carbon black as collected and discharged is free from the moisture of any cooling liquid employed prior to its collection.

In the accompanying drawings Figure 1 is a diagrammatic plan view of the apparatus, or unit, of the present invention; Figure 2 is an end view, partially in vertical section, of the apparatus; Figure 3 is a vertical sectional view on the line 3—3 Figure 2; Figure 4 is a cross sectional view through the conducting and conveying conduit of the apparatus; Figure 5 is a detail view in vertical section through the lock between the conduits for conveying the carbon black; Figure 6 is a similar view taken at right angles to Figure 5; and Figure 7 is a diagrammatic plan view of apparatus comprising a single decomposing furnace.

The apparatus comprises primarily a plurality of decomposing furnaces A, B, C, and D. Each of these furnaces comprises a bottom wall 1, side and top walls 2 and 3, a stack 4, and checkerwork 5 of a refractory material capable of continued use at high temperatures.

The process of decomposing the hydrocarbons for the production of carbon black, as described in the application above noted, consists in creating a high temperature within the furnace, and passing the hydrocarbons to be decomposed through the furnace at a high rate of speed.

In conducting such process, air and a combustible gas are admitted to a lower portion of the furnace by way of air pipes 6 provided with valves 7, and gas pipes 8 provided with valves 9. The products of combustion pass upwardly through the furnace, heating the checkerwork 5, and leave the furnace by way of outlet valve 10 in stack 4. This heating is continued until the interior of the furnace including the checkerwork 5 is raised to a high temperature, desirably to a temperature no less than twelve hundred degrees centigrade and which may be as high as fourteen hundred degrees centigrade.

The valves 7 and 9 in the pipes 6 and 8 are then closed, and outlet valve 10 in stack 4 is also closed, valve 11 in the supply pipe 12 for the hydrocarbons to be decomposed is then opened, and the hydrocarbons are admitted to the upper portion of the furnace.

In its passage through the highly heated checkerwork the hydrocarbon gas is decomposed by the high temperature and most of the hydrocarbon molecules are disassociated, their carbon being thus converted from a carbon in gaseous combination into an elemental carbon black in solid state. Approximately two-thirds of the total quantity of the solid carbon black initially formed remains in the checkerwork and is not recovered. This carbon black is that which if formed by impingement of the hydrocarbon gases against the heated checkerwork, and that which, though otherwise formed, has come in contact with and adhered to the checkerwork. Such carbon is commercially valueless, because it is in hard gritty form due to the continued heating which it has received in the furnace.

When the temperature of the furnace has been so lowered by the decomposing operation that it will no longer operate satisfactorily, the decomposing operation is discontinued and the furnace again reheated. For this purpose the valve 11 in the supply pipe 12 for the hydrocarbon to be decomposed is closed. The valves 7 and 9 in the gas and air pipes 6 and 8 are opened, and the valve 10 in stack 4 is also opened. Combustion is thus again effected for reheating the checkerwork within the furnace. During this reheating operation a supply of air in excess of that required for producing combustion of the heating gas is supplied.

As the interior of the furnace is always at a relatively high temperature, the excess of air results in the combustion of the carbon black accumulated in the checkerwork. This combustion, or oxidation, results in the formation of carbon monoxide (CO) and carbon dioxide ($CO_2$) which pass from the furnace by way of the stack 4 with the products of combustion of the fuel. This combustion of the detained carbon cleans the checkerwork, and also economizes fuel by utilizing the heating effect produced by the oxidation of this carbon.

The mixture of gases and carbon black in solid state, as such mixture passes from a decomposing furnace, is exceedingly difficult to conduct to the point of separation of the carbon black from the carrying gases. This is because there is a constant deposition of carbon black from the mixture on the interior surface of a conduit, which deposited carbon black accumulates so rapidly as to completely clog pipes or tubes within a relatively short period of time. The separated carbon black also possesses a marked tendency to mass and pack to clog a conduit through which it is passed.

It is also a fact that external cooling of a conduit through which the mixture of gases and carbon black passes tends to promote deposition of the carbon black on the interor wall of such conduit. As the mixture should be cooled prior to the separation of the carbon black in order to avoid destruction of the separating means, it is desirable to cool the mixture by the direct contact of a cooling liquid. Any moisture in the carbon black, however, greatly emphasizes the tendency of the carbon black to mass and pack. It is, therefore, highly desirable that the carbon black be freed from the moisture of the cooling liquid as soon as possible after its separation.

The decomposing furnaces A, B, C, and D are provided respectively with discharge conduits $13^a$, $13^b$, $13^c$, and $13^d$ which open adjacent the lower extremities of cooling towers $14^a$, $14^b$, $14^c$, and $14^d$. Each of the cooling towers is provided with a plurality of sprays 15 receiving a cooling liquid from pipes 16. Both of the cooling towers $14^a$ and $14^c$ discharge adjacent the upper extremity of a mixing tower or "downcomer" 17, while both of the cooling towers $14^b$ and $14^d$ discharge adjacent the upper extremity of a mixing tower or "downcomer" 18. The "downcomer" 17 has a discharge outlet, controlled by valve 19, into a conduit 20, which contains a screw conveyor 21. The "downcomer" 18 has a discharge outlet, controlled by a valve 22, into the same conduit 20 adjacent the opposite end thereof. The cooling towers $14^a$ and $14^c$ communicate with the mixing tower or "downcomer" 17 by way of conducting and conveying conduits 23, each of which contains a screw conveyor $23^a$. Similarly, the cooling towers $14^b$ and $14^d$ communicate with the "downcomer" 18 by way of conducting and conveying conduits 24 each of which contains a screw conveyor $24^b$ and $24^d$.

Between the "downcomers" 17 and 18 are a plurality of collecting chambers 25 for separating the carbon black from the gases by which it is carried, and for collecting this carbon black. All of the collecting chambers 25 are in communication with a gas discharge conduit 26 leading to a gasometer 27. The lower portion of each of the collecting chambers is formed to provide a hopper 28 having an outlet controlled by a valve 29 into the conduit 20. In each of the collecting chambers 25 are a plurality of sacks 30, of wool or other suitable fabric, which serve to separate the carbon from the carrying current of gases. These sacks 30 may be agitated by any suitable means indicated generally by the reference numeral 31 to cause the separated carbon black to fall into the hoppers 28 at the lower extremities of the collecting chambers.

The carbon black is discharged from conduit 20 into a second conduit 32, which is provided with a similar screw conveyor, and is carried through such conduit to a suitable storage bin or tank 33. Communication between the conduits 20 and 32 is controlled by a special valve or lock 34. This lock comprises a rotatable shaft 35 carrying a plurality of vanes 36, which closely engage the interior surface of the valve casing 37. As carbon black accumulates on a vane of the valve, the shaft 35 may be rotated to discharge the carbon black into the conduit 32. It thus serves to discharge the carbon black, while preventing the passage of any appreciable volume of gas.

If all the decomposing furnaces A, B, C, and D be utilized simultaneously in conducting a decomposing operation, the products of decomposition will pass through the apparatus in the following manner. Gases carrying particles of carbon black will pass from the furnaces A and C into the cooling chambers $14^a$ and $14^c$, in which the mixture of gases and carbon black will be cooled by sprays 15 to a temperature lower than that at which they issue from the furnaces. From the cooling chambers $14^a$ and $14^c$ the mixture of gases and carbon black passes by way of conduits 23 and "donwcomer" 17 into the conveyor conduit 20, and passes along such conduit in the direction indicated by the arrows. From conduit 20 the cooled mixture of gases and carbon black passes into one or more of the separating chambers 25, the greater volume entering into the chamber or chambers which are closely connected to the "downcomer" 17. In the chambers 25 the carbon black is separated from the carrying gases, which pass by way of gas outlet conduit 26 to the gasometer 27. The carbon black, which is separated from the gases, falls into the hoppers 28, and is carried by the screw conveyor 21 to valve 34 and conduit 32.

Simultaneously the mixture of gases and carbon black from the furnaces B and D passes by way of cooling chambers 14$^b$ and 14$^d$, conveying conduits 24, and "downcomer" 18 into the conduit 20, along which such mixture passes in a direction counter to that indicated by the arrows. Passing into collecting chambers 25, such mixture is also separated into gases which pass to the gasometer, and carbon black which falls into the conduit 20.

It will be noted that a current of gas, which is still at a relatively high temperature, passes through the conduit carrying the carbon black in solid form, and that its direction is counter to that of the passage of the carbon black through the conduit. The discharge conduit is thus maintained at a high temperature throughout its length, and the carbon black is brought into intimate contact, subsequent to its separation, with a heated gas. The carbon black is thus freed from any moisture which it may have gathered from vapor condensed within the collecting chambers or from any other source, and is delivered for storage in an absolutely dry condition. Condensation of vapor within the conveying conduit itself is obviously prevented.

It will be noted that the carbon black is not only kept free from moisture after its separation from the carrying gases, but that the arrangement as a whole is designed to avoid the collection and packing of carbon black in the conduits of the apparatus. Thus the passages between the furnaces and the common conveying conduit are short, and are either of relatively great cross sectional area or are provided with screw conveyors to carry along any carbon which might be deposited.

It is desirable, however, to so conduct operations in the unit that two of the decomposing furnaces are employed in effecting a decomposing operation while two are being heated to the decomposing temperature. In such event the furnaces A and C should not be utilized for the decomposing operation nor undergo the heating operation simultaneously; and similarly the furnaces B and D should not be employed in a decomposing operation or undergo the heating operation simultaneously. By operating and reheating the furnaces A and B and the furnaces C and D, simultaneously in pairs or by operating and reheating the furnaces A and D and B and C simultaneously in pairs, the effect of the counter-passage of the separated carbon black and the heated gases may be obtained equally as well as when all the four furnaces are simultaneously at the same stage of their operation.

In Figure 7 apparatus comprising a single decomposing furnace A' is shown. This apparatus also comprises separating chambers 38 for separating the solid carbon black from the gases of decomposition, and a single conduit 39 for conducting the mixture of gases and carbon black to the separating chambers and for conveying the separated carbon black from such chambers. It will be noted that in this arrangement the separating chambers 38 are disposed at one end of the conduit 39, and the lock 40, through which carbon is discharged into the second conveying conduit 41, is at the opposite end of conduit 39. The mixture of carbon black and hot gases from the furnace is thus enabled to heat the conduit, and such mixture passes along a portion of the conduit in a direction counter to the direction in which the separated carbon black is carried. With this arrangement the drying effect upon the carbon black may be obtained although the apparatus comprises only one decomposing furnace.

The advantages of the apparatus illustrated and described herein will be readily appreciated by those skilled in the art to which the invention pertains.

What I claim is:

1. In apparatus for the production of carbon black the combination of a plurality of decomposing furnaces with means for separating carbon black in solid state from the gases with which it is produced and passed from the furnaces, a single conduit for conducting the mixture of gases and carbon black from all the furnaces to the separating means and for conveying the separated carbon black therefrom, and connections from the furnaces to said conducting and conveying conduit; the arrangement of the connections being such that the mixture of gases and carbon black from at least one of said furnaces passes along said conducting and conveying conduit in a direction counter to that of the passage of the separated carbon black therein.

2. In apparatus for the production of carbon black the combination of a plurality of decomposing furnaces with means for separating carbon black in solid state from the gases with which it is produced and passed from the furnaces, a single conduit for conducting the mixture of gases and carbon black from all the furnaces to the separating means and for conveying the separated carbon black therefrom, connections from the furnaces to said conducting and conveying conduit, and means in said connections for subjecting the mixture of hot gases and carbon black to a spray of cooling liquid; the arrangement of the connections being such that the mixture of gases and carbon black from at least one of said furnaces passes along said conduit in a direction counter to that of the passage of the separated carbon black therein.

3. In apparatus for the production of carbon black the combination of at least one decomposing furnace with means for separating carbon black in solid state from the gases with which it is produced, a single conduit for conducting the mixture of gases and carbon black to the separating means and for conveying the separated carbon black therefrom, and furnace outlet connections to said conducting and conveying conduit adjacent both ends thereof; whereby a portion of the mixture of heated gases and carbon black is passed along the conduit in a direction counter to that of the passage of separated carbon black therein.

4. In apparatus for the production of carbon black the combination of at least one decomposing furnace with means for separating carbon black in solid state from the gases with which it is produced, a single conduit for conducting the mixture of gases and carbon black to the separating means and for conveying the separated carbon black therefrom, furnace outlet connections to said conducting and conveying conduit, whereby a portion of the mixture of heated gases and carbon black is passed along the conduit in a direction counter to that of the passage of the separated carbon black therein, and means in said connections for subjecting the mixture of heated gases and carbon black to a spray of cooling liquid.

5. In apparatus for the production of carbon black the combination of a plurality of decomposing furnaces with means for separating carbon black in solid state from the gases with which it is produced and passed from the furnaces, a conduit for conducting the mixture of gases and carbon black from all the furnaces to the separating means and for conveying the separated carbon black therefrom, and connections from the furnaces to the separating and conveying conduit; the arrangement of the connections being such that the mixture of gases and carbon black from at least one furnace enters the portion of the conduit containing separated carbon black from another furnace and comes into intimate contact therewith.

6. In apparatus for the production of carbon black the combination of a plurality of decomposing furnaces with means for separating carbon black in solid state from the gases with which it is produced and passed from the furnaces, a conduit for conducting the mixture of gases and carbon black from all the furnaces to the separating means and for conveying the separated carbon black therefrom, connections from the furnaces to said conducting and conveying conduit, and means in said connections for subjecting the mixture of hot gases and carbon black to a spray of cooling liquid; the arrangement being such that the mixture of gases and carbon black from at least one furnace enters the portion of the conduit containing separated carbon black from another furnace and comes into intimate contact therewith.

In witness whereof, I hereunto set my hand.

ROY H. UHLINGER.